(12) United States Patent
Spruck et al.

(10) Patent No.: US 8,681,344 B2
(45) Date of Patent: Mar. 25, 2014

(54) DEVICES AND METHODS FOR POSITION DETERMINATION AND SURFACE MEASUREMENT

(75) Inventors: Bernd Spruck, Moegglingen (DE); Cristina Alvarez Diez, Aalen (DE); Simon Brattke, Oberkochen (DE); Lars-Christian Wittig, Jena (DE); Stefan Richter, Jena (DE); Enrico Geissler, Jena (DE); Christian Koos, Karlsruhe (DE); Oliver Schmidt, Erlangen (DE); Frank Hoeller, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 13/394,916

(22) PCT Filed: Aug. 30, 2010

(86) PCT No.: PCT/EP2010/062637
§ 371 (c)(1),
(2), (4) Date: May 15, 2012

(87) PCT Pub. No.: WO2011/029740
PCT Pub. Date: Mar. 17, 2011

(65) Prior Publication Data
US 2012/0218563 A1    Aug. 30, 2012

(30) Foreign Application Priority Data
Sep. 10, 2009   (DE) .................. 10 2009 040 837

(51) Int. Cl.
*G01B 11/14*      (2006.01)
*G01B 11/24*      (2006.01)
*G01B 11/02*      (2006.01)

(52) U.S. Cl.
CPC .............. *G01B 11/24* (2013.01); *G01B 11/026* (2013.01)

USPC .......................... 356/614; 356/620; 356/622

(58) Field of Classification Search
CPC .............................. G01N 11/14; G01B 11/026
USPC .................................... 356/612–624
See application file for complete search history.

(56) References Cited

U.S. PATENT DOCUMENTS

2002/0143506 A1   10/2002   D'Aligny
2009/0177438 A1    7/2009   Raab

FOREIGN PATENT DOCUMENTS

| | | |
|---|---|---|
| DE | 10118392 | 11/2002 |
| EP | 1536248 | 6/2005 |
| WO | 03062744 | 7/2003 |
| WO | 2010025845 | 3/2010 |

OTHER PUBLICATIONS

K. Minoshima and H. Matsumoto, "High-Accuracy Measurement of 240-m Distance in an Optical Tunnel by Use of a Compact Femtosecond Laser"—Applied Optics, vol. 39, No. 30, pp. 5512-5517 (Oct. 20, 2000).

*Primary Examiner* — Michael P Stafira

(74) *Attorney, Agent, or Firm* — Sand & Sebolt

(57) ABSTRACT

In an embodiment a method for position determination of an object in a spatial area is provided in which the object is illuminated with at least one light beam. The light beam does not cover the complete spatial area and is guided into a part of the spatial area in which the object is present depending on the position of the object. In another aspect a method for measuring a surface is provided.

36 Claims, 12 Drawing Sheets

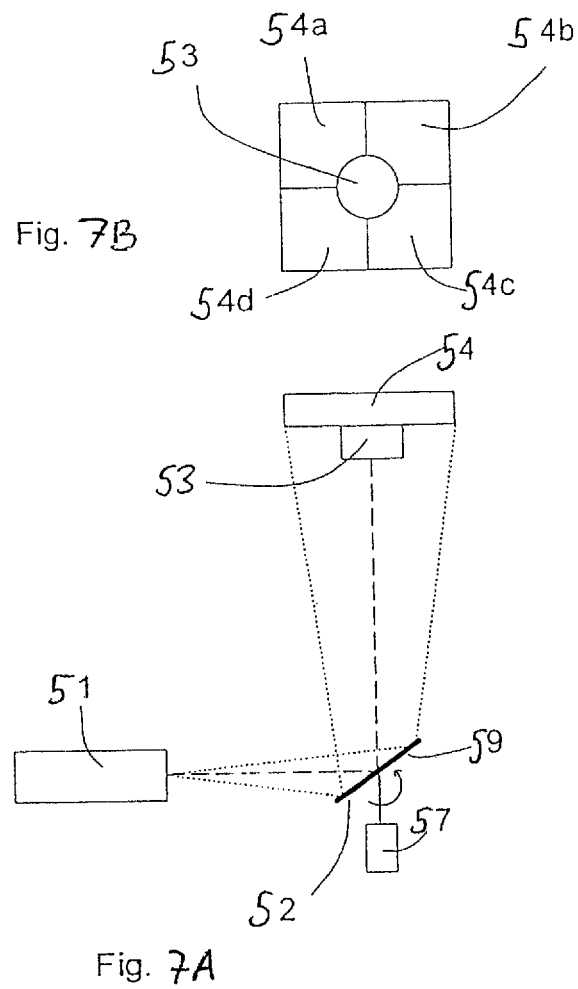
Fig. 7B
Fig. 7A
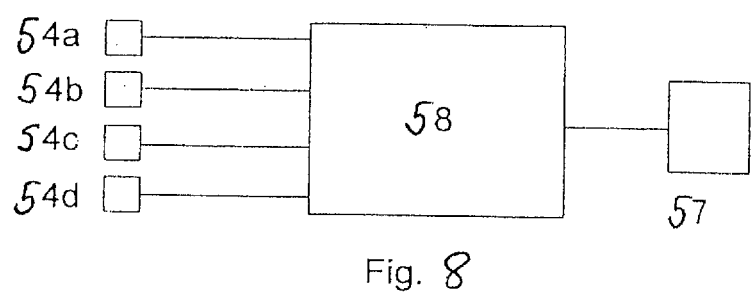
Fig. 8

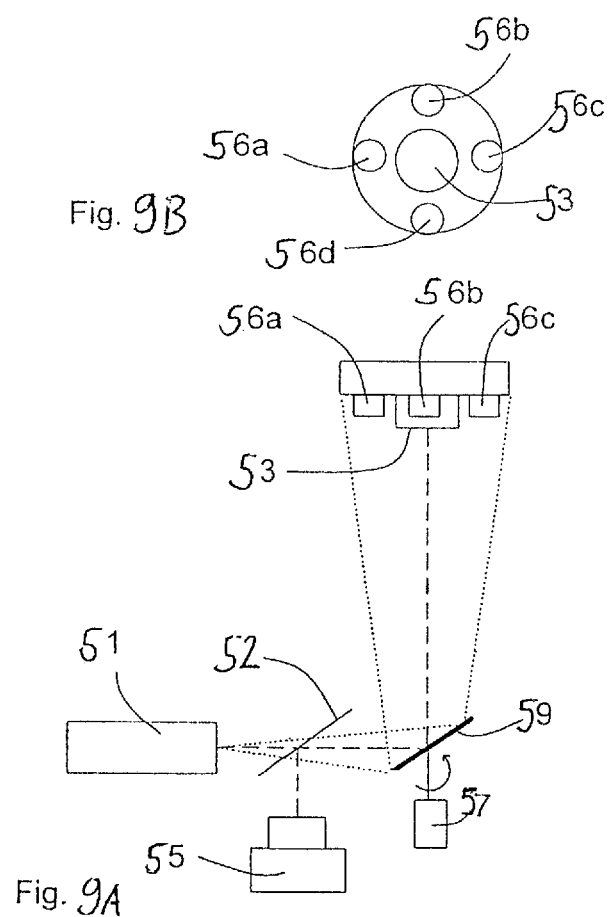

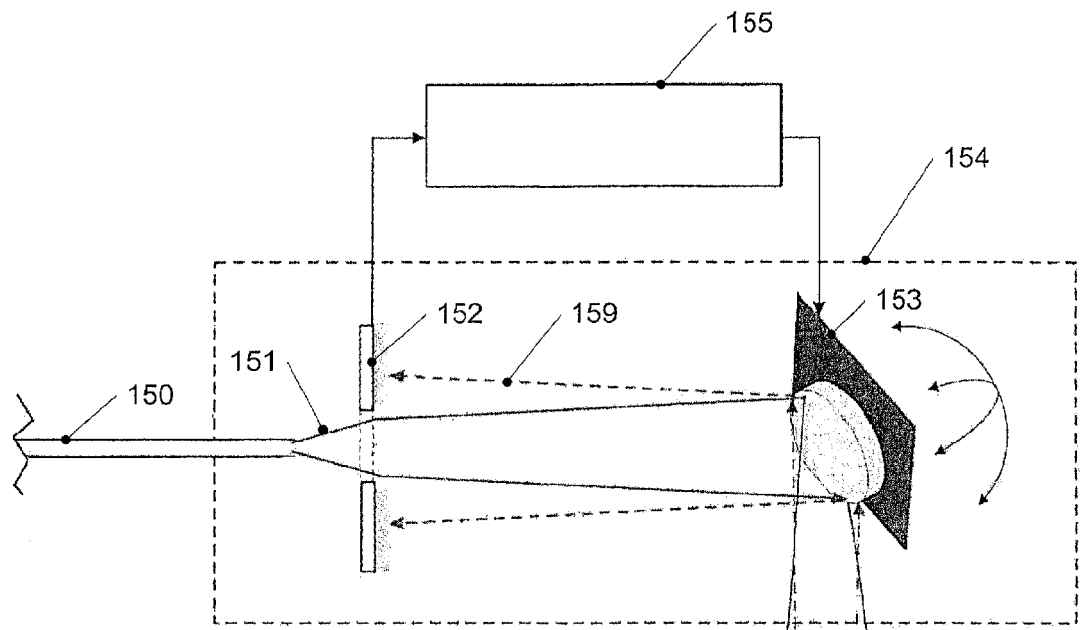
Fig. 10A
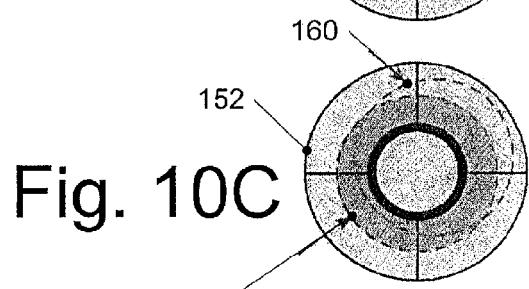
Fig. 10B
Fig. 10C
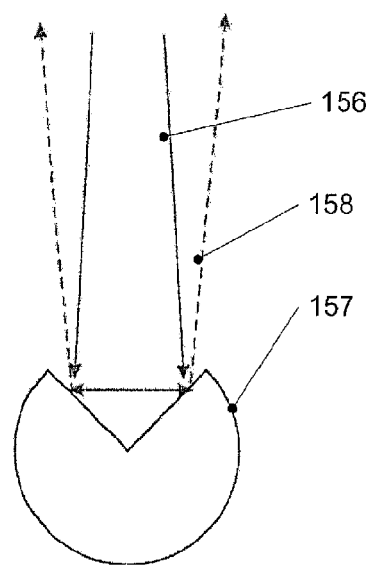

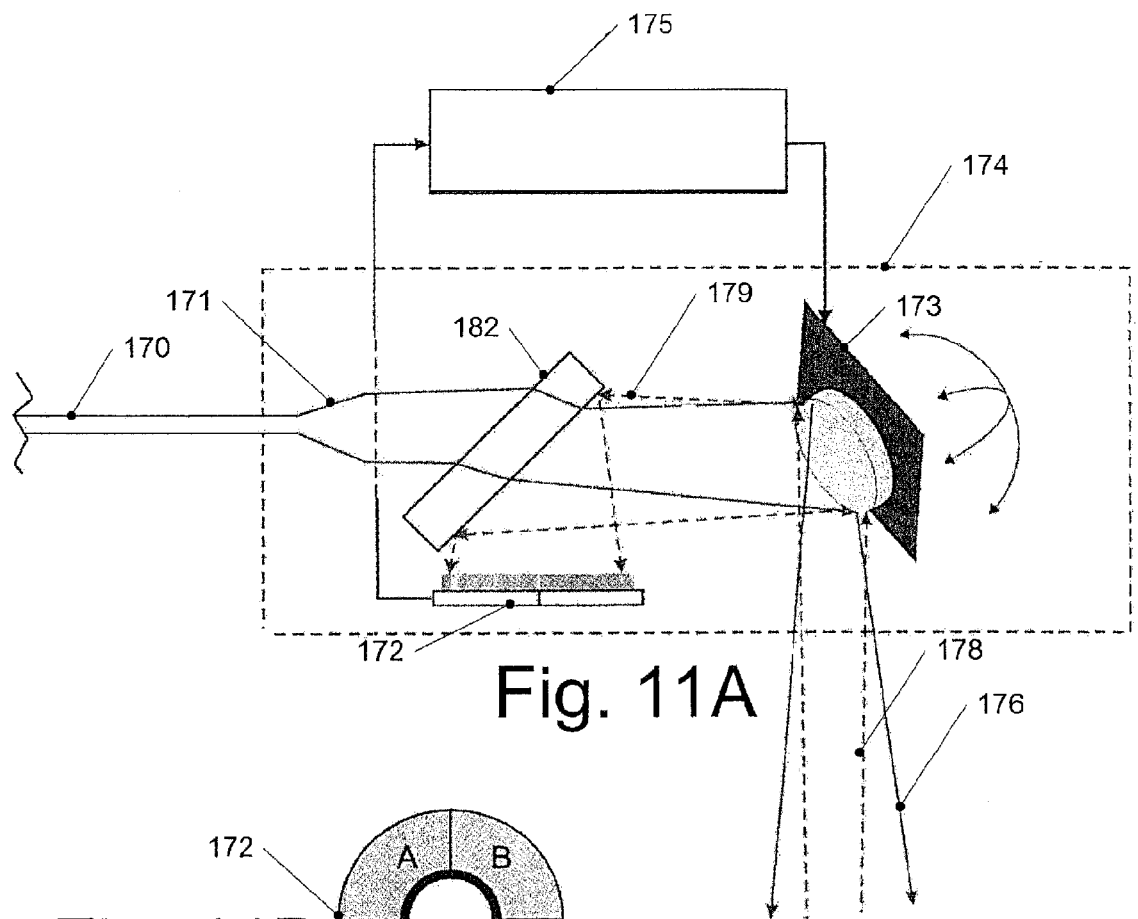
Fig. 11A
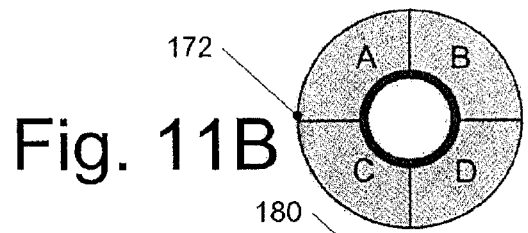
Fig. 11B
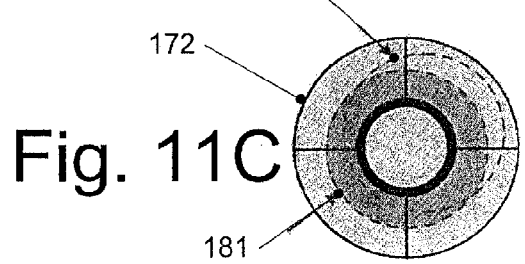
Fig. 11C
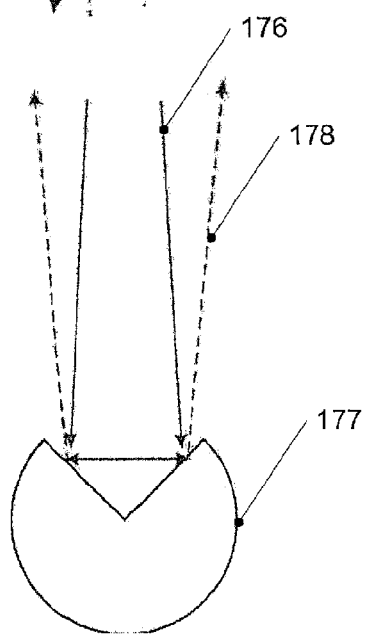

DEVICES AND METHODS FOR POSITION DETERMINATION AND SURFACE MEASUREMENT

CROSS-REFERENCE TO RELATED APPLICATIONS

This application is a National Stage entry of PCT/EP2010/062637 having an international application date of Aug. 30, 2010, which application claims priority from German Patent Application Serial No. 10 2009 040 837.1, filed Sep. 10, 2009.

BACKGROUND OF THE INVENTION

1. Technical Field

This invention relates to devices and methods for position determination and for surface measurement. In particular, the present invention relates to such devices and methods which use optical measurement methods, for example use a laser.

2. Background Information

Coordinate measuring devices are an example application field in which a position determination in a three-dimensional space is desired with an accuracy as high as possible. Coordinate measurement devices typically have a measurement head which for example may be provided with a tracer pin or other sensors. For determining positions on a surface of an object, the position of the measurement head and, if the tracer pin is mounted on the measurement head in a movable manner, the position of the tracer pin relative to the measurement head is determined. Conventionally, for determining a position of the measurement head linear scales are provided in the coordinate measurement device which feedback the position of the measurement head indirectly via movement paths of the individual axes. This, however, requires a solid mechanical construction to prevent a corruption of measurement results through a present looseness or through mechanical deformation.

Distances may be determined by a measurement of a path traveled by electromagnetic radiation, for example light. To achieve this, the electromagnetic radiation travels through a path between a reference position and the object once or a plurality of times, such that the distance may be derived from the length of the path traveled by the radiation.

The realization of devices and methods in which distances or object positions are determined in spaces having a length of several meters with an accuracy in the order of several micrometers or several ten micrometers is a technical challenge. This applies in particular if positions are to be determined with a high measurement rate.

Laser distance measurement devices enable determination of a distance of an object. In K. Minoshima and H. Matsumoto, "High-Accuracy Measurement of 240-m distance in an optical tunnel by use of a compact femtosecond laser", Applied Optics, vol. 39, No. 30 pp. 5512-5517 (2000) a measurement of a distance using optical frequency combs is described. In this measurement the phase position of a signal component of the intensity of the laser beam frequency comb is evaluated to determine a distance traveled by the laser beam. The signal component is chosen such that it oscillates with a frequency which corresponds to a typically high multiple of the repetition rate of the laser beam. The measurement of a phase difference for such a signal component allows the determination of a position in a so-called unambiguousness area which is equal to the speed of light divided by the frequency of the signal component. To obtain an estimation of the distance which approximates the distance to be measured within the unambiguousness area for example DE 10 2008 045 386.2 of the present applicant proposes to evaluate sequentially different signal components of captured measurement signals, which oscillate with different frequencies. For this additional measurement an evaluation time is, however, needed.

Generally in optical methods for determining a position in a three-dimensional space based on travel time measurements or measurements of a phase difference, respectively, an object the position of which is to be determined is illuminated with a light beam, typically a laser beam, and the light reflected from the object, for example from a retroreflector mounted to the object, is detected. In this case it has to be ensured that the object, for example a measurement head of a coordinate measurement device as described above, is illuminated by the light beam in a complete measurement volume. Conventionally, the light beam is expanded via optical elements such that it illuminates the complete measurement volume. This expansion, however, leads to only a relatively small part of the laser beam being reflected from the object and therefore a signal intensity at a detector which is small compared with the incident laser power.

In other methods the reverse approach may be used, i.e. from the object, for example from a measurement head mounted to the object, one or more stationary reflectors are illuminated, and the reflected light is detected at the object. Also here it has to be ensured that independent from movements of the object in the space of interest the reflector or the reflectors is/are illuminated. Conventionally also in this case the light beam may be expanded with optical elements, which in turn leads to a low signal intensity.

Generally, it would be desirable to use the laser power more efficiently, to obtain a better signal-to-noise ratio at one or more detectors used and/or to be able to use lasers with reduced power.

Similar optical measurement methods, for example using laser light, may also be employed in surface measurements. Here for example a surface to be measured is illuminated with a laser, for example a short-pulse laser, and the light reflected from the surface is detected with one or more detectors. For a three-dimensional measurement at least three independent detectors are necessary, in case less dimensions are to be measured less detectors may be used correspondingly.

Also in such devices and methods it is desirable be able to detect as big a part as possible of the laser power reflected from the surface.

BRIEF SUMMARY OF THE INVENTION

Therefore, it is an object of the present invention to provide devices and methods with which a more efficient use of an irradiation intensity for position determination or for surface measurements is possible.

According to an aspect of the invention a device for determining the position of an object in a spatial area is provided, comprising at least one light source for generating a light beam to illuminate a reflector, detector means for detecting light reflected from the reflector as well as evaluation means for determining the position of the object on the basis of the detected light. Furthermore, guiding means for guiding the light beam into a part of the spatial area where the reflector is present are provided.

By providing the guiding means it is not necessary that the light beam illuminates a complete measurement volume or a volume in which the reflector may be present relative to the guiding means. Therefore, the intensity of the irradiation of the irradiation device may be used more efficiently.

The device may comprise an optic for expanding the light beam.

The at least one light source may comprise one or more short-pulse lasers. For three-dimensional position determination the at least one light source may in particular generate three light beams, where it is possible to split up a beam of a single light source with beam splitters.

The guiding means may align the light beam based on position information of the reflector or the light source, for example based on position feedback of a robot if the reflector, the light source and/or the object is positioned at a robot arm. In other embodiments additional detectors, for example a quadrant detector and/or additional light sources, for example light sources mounted to the object, may be used to provide information for the guiding means on the basis of which the light beam is aligned in the direction of the object.

The reflector may be mounted to the object the position of which is to be determined. In this case the position of the object corresponds with the position of the reflector, and from the object, i.e. from the reflector mounted to the object, reflected light beams are detected. In this case the at least one light source may be stationary, and by detecting the reflected light a distance of the reflector from the at least one stationary light source may be determined. In case the at least one light source comprises for example three light sources, the position may then be determined by trilateration.

In another variant the at least one light source is mounted to the object or at least one light beam is radiated from the object, respectively, and one or more stationary reflectors are used. Also in this case for example by measurement with three different stationary reflectors the position of the at least one light source and therefore the position of the object to which the at least one light source is mounted may be determined via trilateration.

According to another aspect a device for measuring a surface is provided, comprising a light source for irradiating the surface, detector means for detecting light reflected from the surface and evaluation means for determining surface parameters depending on the light detected by the at least one detector. According to the invention the device further comprises alignment means for aligning the at least one detector in the direction of the reflected light.

Through aligning the detector means in the direction of the reflected light an efficiency of light gathering by the detector may be improved.

The detector means may in particular comprise a collecting optic for collecting and focusing the reflected light. Through the alignment means it can be ensured that the light focused by the collecting object impinges on the detector means.

For controlling the alignment means further detector means for determining the direction of the reflected light may be provided, which may for example be arranged parallel to the detector means. The further detector means may for example comprise a quadrant diode.

In further aspects of the present invention corresponding methods are provided.

BRIEF DESCRIPTION OF THE DRAWINGS

In the following the invention will be described using embodiments referring to the attached drawings.

FIGS. 7A and 7B schematically show an irradiation arrangement according to a further embodiment.

FIG. 8 shows a block diagram of an evaluation arrangement for the irradiation arrangement of FIGS. 7A and 7B.

FIGS. 9A and 9B show an irradiation arrangement according to a further embodiment.

FIGS. 10A-10C show an irradiation arrangement according to a further embodiment.

FIGS. 11A-11C show an irradiation arrangement according to another embodiment.

DETAILED DESCRIPTION OF THE INVENTION

In the following embodiments of the invention are explained in more detail. The features of the different embodiments may be combined with each other, unless it is explicitly excluded in the description which follows. Even if specific embodiments are described in view of specific applications as position determination in industrial arrangements or surface measurements in industrial arrangements, the present invention is not restricted to this application.

Figure 1:
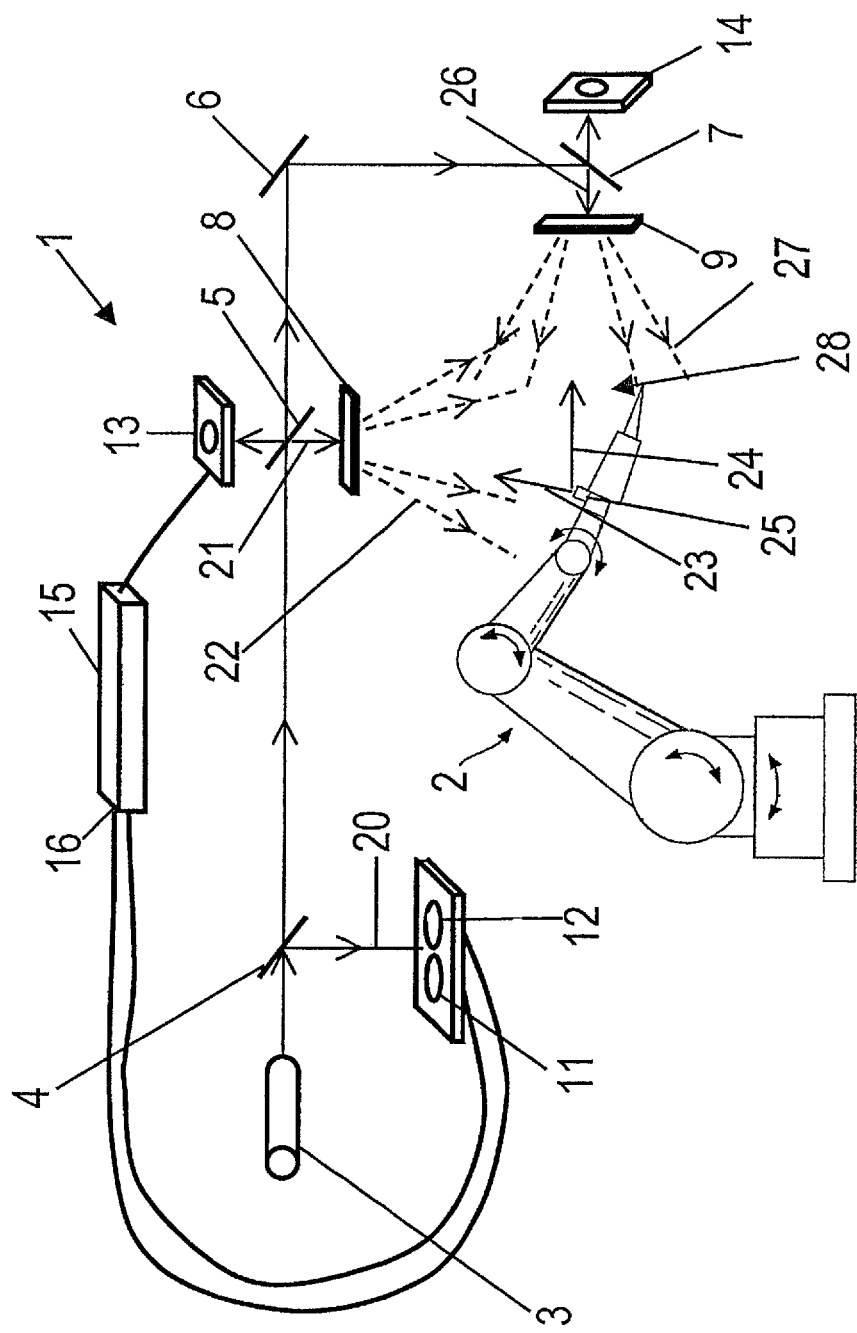
FIG. 1 is a schematic representation of a device according to an embodiment.

FIG. 1 is a schematic representation of a device 1 for determining a position of an object according to an embodiment. The device 1 is shown in context of an exemplary application, in which the position of a component of the robot arm 2 which is provided with a retroreflector 25 is determined, but may as well be employed in other embodiments and in other applications.

The device 1 comprises a light source 3, which generates a sequence of short light pulses with a repetition rate, a light guiding arrangement which is implemented by a plurality of optical elements 4-9, a pair of reference signal detectors 11, 12 with a first reference signal detector 11 and a second reference signal detector 12, a detector arrangement with a plurality of optical detectors 13, 14 and an evaluation circuit 15. The light guide arrangement receives the sequence of light pulses and guides the sequence of light pulses to the pair of reference signal detectors 11, 12 and into the spatial area generally designated 28, in which the position of the retroreflector 25 mounted to the robot arm is to be determined. For sake of simplicity, in the following the light guided by the light guide arrangement to the reference signal detectors 11, 12 and into the spatial area 28 is also referred to as the sequence of light pulses, wherein it can be seen that only a part of the light pulse intensity generated by light source 2 is guided to the reference signal detectors 11, 12 and into the spatial area 28, respectively. The sequence of light pulses is reflected in the spatial area by retroreflector 25 mounted to the robot arm 2. The reflected sequence of light pulses is captured by the detectors 13, 14. The evaluation circuit 15 determines from the signal from the reference signal detectors 11, 12, which are received at a reference signal input 16, and from the signals from the detectors 13, 14 a phase position of signal components of the light signals captured at the detectors 13, 14, which have a relation to the travel time of the light pulses in the spatial area 28 and therefore to the distance of the retroreflector 25 from different elements of the light guide arrangement. In this way the position of the retroreflector 25 may be determined. As will be described in further detail, the determination of the phase position by the evaluation circuit 15 is based on signal components of the light signals captured at the detectors 13, 14 which have a frequency having a multiple of the repetition rate.

The detectors 13, 14 and the reference signal detectors 11, 12 are for example implemented as photo detectors and capture the incident light intensity.

While in FIG. 1 for the sake of a clear arrangement only two beams splitters 5, 7 are shown from which light is guided into the spatial area 28, and two correspondingly assigned detectors 13, 14 are shown, light may be guided into the spatial area in which the position of the object is to be determined from more than two positions. In case all three spatial coordinates of the retroreflector 35 are to be determined, the sequence of light pulses may be guided into the spatial area 28 from at least one further irradiation position, which is not arranged on a line which is defined by the beam exit points at the beam splitters 5 and 7.

The operation of the various components of the device 1 will be explained in more detail in the following. The light source 3 generates an optical signal which is modulated with a periodic function and which has a fundamental frequency f0 as well as pronounced components of harmonics of the fundamental frequency f0, i.e. pronounced frequency components having frequencies which are multiples of f0. Such a signal is, for example, generated by a short-pulse laser which generates a sequence of light pulses in a well-defined interval T0=1/f0, i.e. with a repetition rate f0, with the duration of each pulse being short compared to the interval T0 between successive pulses.

The duration of each pulse can be very small compared to the interval T0 between successive light pulses, for example of the order $1 \cdot 10^{-5}$. In the device 3 repetition rate f0 and the duration of each pulse may be selected depending on a desired measurement accuracy of the position determination, an initial uncertainty regarding the position of the object, and the signal component of the light signals detected at the detectors 13, 14, for which a phase position is to be determined, or depending on further factors. In case for determining the phase difference the nth harmonic of f0 is to be used, the duration of each light pulse at the interval T0 between successive light pulses is chosen such that the sequence of light signals output from light source 3 has a sufficient spectral weight at the frequency n·f0. As pulse form a sequence of rectangular pulses may be chosen, but also other suitable pulse forms may be chosen, for example the square of a hyperbolic secans or a Gaussian function.

A suitable sequence of light pulses may be generated by different lasers which are configured for generating short light pulses. In particular, optical frequency synthesizers may be used. For example, an electrically pumped diode laser, for example a quality factor switched laser, a gain switched laser, an active or passive mode coupled laser or a laser which hybrid mode coupling or a mode-coupled surface emitting laser with vertical resonator (vertical-cavity surface emitting laser, VCSEL) may be used as light source 3. It is also possible to use an optically pumped laser, for example a passively mode-coupled surface emitting laser with external vertical resonator (vertical external cavity surface emitting lasers, VECSEL), or a laser based on photonic crystal fibers (photonic crystal fiber laser) may be used as light source 3. Examples for pulse durations of the light source 3 are in the order of 100 fs to 100 ps. Examples for repetition rates are in a range from 50 MHz to 50 GHz. Examples for mean laser power are in a range from 1 mW to 10 W. Examples of values for the pulse jitter are between 10 fs and 1 ps effective value (mean square value).

As shown in FIG. 1, the sequence of light pulses output from light source 3 is guided by the light guiding arrangement to the reference signal detectors 11, 12 and into the spatial area 28. The light guiding arrangement in the device 1 comprises a plurality of beam splitters 4, 5 and 7, a mirror 6 and beam expanders 8, 9 which are assigned to the beam splitters 5 and 7, respectively. Beam splitter 4 receives the sequence of light pulses from light source 3. A partial beam 20 of the sequence of light pulses is guided by beam splitter 4 to the reference signal detectors 11, 12 as a reference signal. If necessary, an optical element for beam splitting, in particular a beam splitter, may be arranged downstream of beam splitter 4, to ensure that partial beam 20 impinges on reference signal detector 11 as well as on reference signal detector 12. A further partial beam of the sequence of light pulses is transmitted by beam splitter 4 and impinges on beam splitter 5. Beam splitter 5 guides a partial beam 21 of the sequence of light pulses via beam expander 8 into the spatial area 28, wherein beam expander 8 expands partial beam 21 to a light cone 22. A further partial beam is transmitted by beam splitter 5 and is guided via mirror 6 onto beam splitter 7. Beam splitter 7 guides a partial beam 26 of the sequence of light pulses via beam expander 9 into the spatial area 28, wherein beam expander 9 expands partial beam 26 to a light cone 27. In the shown embodiment the expansion of beam expander 8 and the expansion of beam expander 9 is shown such that the light cone 22 and light cone 27, respectively, illuminate only a part of the spatial area 28 in which a position determination is to be enabled. As will be explained later with reference to FIGS. 2-9, tracking arrangements are provided which for example in the embodiment of FIG. 1 guide the light cones 22 and 27 in that part of spatial area 28 in which retroreflector 25 of robot arm 22 is located.

The part of the light beam received by mirror 6 which is transmitted by beam splitter 7 may be guided in the direction of spatial area 28 via a further beam splitter which is not shown in FIG. 1. The part of spatial area 28 in which in a certain position of the tracking arrangements mentioned above the position of the object may be determined corresponds to the overlapping area of the diverse light cones 22, 27. In case the sequence of light pulses is guided in a direction of the spatial area in which the object position is to be determined from more than three positions, the spatial area in which a determination of the object position is possible is the combination of all overlapping areas of at least three different light cones which are emitted from at least three origin points which are not on a straight line.

The sequence of light pulses which is guided into the spatial area 28 via beam splitter 5 and beam expander 8 impinges on the retroreflector 25 and is reflected back by the same in the direction of beam expander 8. The light reflected back in the direction of beam expander 8 from retroreflector 25 forms a first light signal which is guided via beam expander 8 and beam splitter 5 to detector 13. The sequence of light pulses guided into spatial area 28 via beam splitter 7 and beam expander 9 impinges on retroreflector 25 and is reflected back by the same in the direction of beam expander 9. The light reflected back by retroreflector 25 in the direction of beam expander 9 forms a second light signal 24 which via beam expander 9 and beam splitter 7 is guided to detector 14. When retroreflector 25 is located in the light cone of further combinations of beam splitter, beam expander and detector, further light signals are reflected from retroreflector 25, which are guided via the beam expander and beam splitter to the respective detector.

The light guiding arrangement guiding the sequence of light pulses into the spatial area 28 and the detectors 13, 14 of the detector arrangement are positioned such that the light signal 23 reflected in the direction of detector 13 is reflected in a different direction as the light signal 24 reflected in the director of detector 14.

The retroreflector 25 provided at robot arm 2 may for example be implemented as corner cube reflector (CCR), as triple prisma or as cat eye reflector or as a ball lense. In case of a corner cube reflector and a triple prisma the light is reflected back parallel to the incident beam direction. A diverging beam remains diverging. With a cat eye reflector and with a ball lense the retroreflectors may be optimized for a certain distance such that the reflected beam bundle is in general reflected back onto itself, whereby a higher signal level is present at the detector.

Instead of a retroreflector also a small scattering element may be used, the scattering behavior of which differs significantly from its environment to scatter light from the relevant object point to the detectors. The small element should scatter light strongly so that at the detector a usable signal is present which is discernable from the scattering environment.

The light signals 23 and 24 are captured by the detectors 13 and 14, respectively. The detectors 13, 14 and reference signal detectors 11, 12 are implemented as photo receivers. The detectors 13 and 14 capture the light power of the sequence of light pulses incident on them, which propagate via the beam splitter 5 and 7, respectively to the retroreflector 25 and from the retroreflector back to the detectors 13 and 14, respectively. The different optical path length of a light pulse to reach one of the reference signal detectors 11, 12 on the one hand and, after a reflection at the retroreflector 25, to reach one of the detectors 13 and 14, respectively, on the other hand, leads to a time delay $\tau_1$ and $\tau_2$, respectively, between the arrival of one and the same light pulse at one of the detectors 13 and 14, respectively, and at the reference signal detectors 11, 12, which is equal to the difference in optical path length of the light pulse divided by the speed of light c. As typically only a small portion of the light guided into spatial area 28 is reflected by retroreflector 25, the signal at the detectors 13, 14 is weakened compared to the reference signal at the reference signal detectors 11, 12.

The path length difference on the one hand includes distances which depend on the geometry of the device, in particular on distances between the beam splitters 5, 7 and the beam splitter 4 as well distances between the beam splitters 4, 5, 7 and the detectors 13, 14 and the reference signal detectors 11, 12, respectively along the light path and on the other hand a component which for the light signal captured at detector 13 is depending on the optical path length between the beam splitter 5 or the virtual point of origin of the light cone 22 and the retroreflector and for the signal captured at detector 14 is depending on the optical path length between the beam splitter 7 or the virtual point of origin of the light cone 27 and the retroreflector 25. As, given the geometry of the device 1 is known, the part of the path length difference depending on the geometry of the device is known, by measuring the time delay $\tau_1$ between light signal 23 at detector 30 and reference signal 20 at reference signal detectors 11, 12 the optical path length traveled by the light pulse between beam splitter 5 and retroreflector 25 and therefore the distance between retroreflector 25 from the light exit point of beam splitter 5 or from the virtual point or origin of light cone 22 may be determined. In a similar manner through measuring the time delay $\tau_1$ and $\tau_2$ between light signal 24 and detector 14 and reference signal 14 at reference signal detectors 11, 12 the optical path length traveled by the light pulse between beam splitter 7 and retroreflector 25 and therefore a distance between retroreflector 25 and the beam exit point of beam splitter 7 or the virtual point or origin of light cone 27 may be determined.

The detectors 13 and 14 as well as reference signal detectors 11, 12 are coupled with evaluation circuit 15 which determines a phase difference between light signals 23, 24 and reference signal 20. Evaluation circuit 15 of device 1 then determines the phase difference between light signals 23, 24 and reference signal 20 for a signal component, whose frequency is basically a multiple of the repetition rate.

On the basis of the determined phase differences which depend on the time delays mentioned above the position of retroreflector 25 may be determined.

It should be noted that the device shown in FIG. 1 merely serves as an example, and the tracking arrangements explained in the following may generally be used in cases in which a position of an object is to be determined in two or three dimensions based on light beams reflected from the object.

Figure 2:
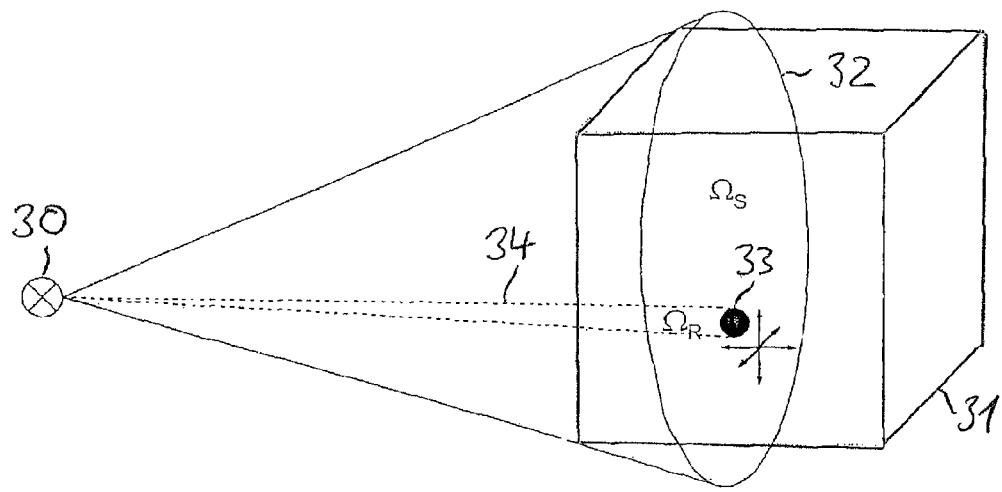
FIG. 2 and FIG. 3 show schematic diagrams for illustrating features of embodiments of the invention.
Figure 3:
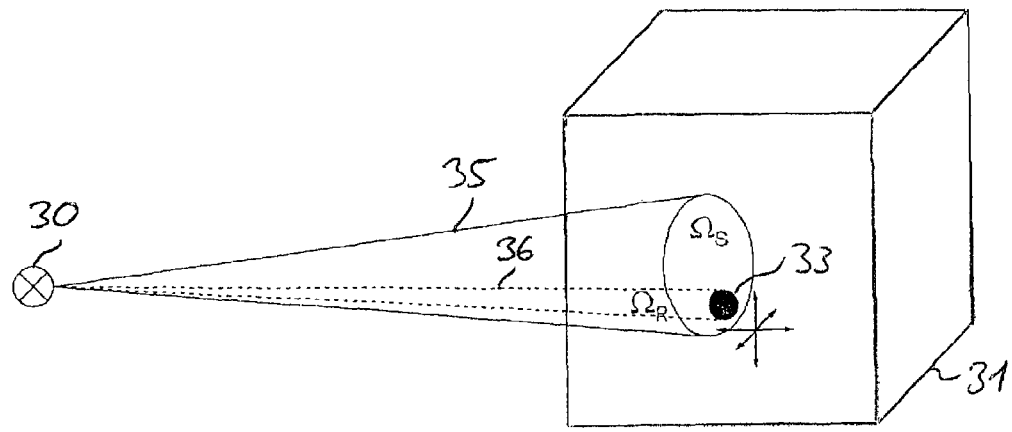

Now referring to FIGS. 2-9, embodiments and principles of the tracking arrangements mentioned above for guiding an in particular expanded light beam to a part of a spatial area of interest, in which a retroreflector the position of which is to be determined is present, will be explained. In FIGS. 2-9 the same reference numerals are used to refer to equal or similar elements. FIGS. 2 and 3 show schematic pictures which explain the background for using a less expanded light beam.

In FIGS. 2 and 3 a retroreflector 33 is schematically represented as a sphere, the position of which is to be determined within a spatial area 31 of interest, which simplified is represented as a cube.

In the example of FIG. 2 a light source 30 generates a light cone 32 which is expanded such that it illuminates basically the complete spatial area 31. A solid angle corresponding to light cone 32 in FIG. 2 is designated $\Omega_S$.

Correspondingly, only a relatively small part of light cone 32 impinges on retroreflector 33. This part of light cone 33 in FIG. 2 is designated with reference numeral 34 and corresponds to a solid angle $\Omega_R$. Only this part which is captured and reflected by retroreflector 33 may be used for detection.

As $\Omega_R/\Omega_S$ in the case of FIG. 2 is relatively small, thus only a small part of the output power of light source 30 is in fact used. This may lead to a relatively inconvenient signal-to-noise ratio and/or require powerful and therefore comparatively expensive light sources 30.

A value for $\Omega_R/\Omega_S$ for such a case may for example be approximately determined from the ratio of the sectional area of retroreflector 33 and the sectional area of spatial area 31. A typical value is for example 1 cm$^2$ for the sectional area or retroreflector 33 and a value of 1 m$^2$ for the sectional area of spatial volume 31, i.e. the measurement volume, which leads to a ratio of $1 \cdot 10^{-4}$.

In contrast in FIG. 3 a light cone 35 is used with which only part of spatial area 31 is illuminated. A part 36 of light cone 35 in turn illuminates retroreflector 33. In case of FIG. 3 as easily seen the ratio $\Omega_R/\Omega_S$ is larger than in case of FIG. 2 or, in other words, in case of FIG. 3 a greater part of the light intensity of light source 30 is used for the actual measurement. However, in this case it is necessary that the light cone 35 tracks a movement of retroreflector 33 such that a measurement may be performed in the whole of spatial area 31. For tracking for example a mirror or also other optical elements may be used. Examples for this will be explained with reference to FIGS. 4 and 5. It is to be noted that, even if in the above explanations and in the following embodiments a cone-shaped expanded light beam, i.e. a diverging light beam, is used as an example, the invention is not limited to such light beams. In other embodiments differently formed light beams, for example collimated light beams, i.e. parallel light beams with a beam diameter determined by a corresponding optic, or converging, i.e. focused light beams, may be used.

Figure 4:
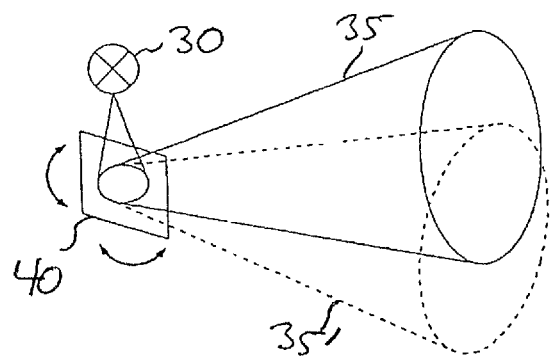
FIG. 4 shows an irradiation arrangement according to an embodiment in a schematic manner.
Figure 5:
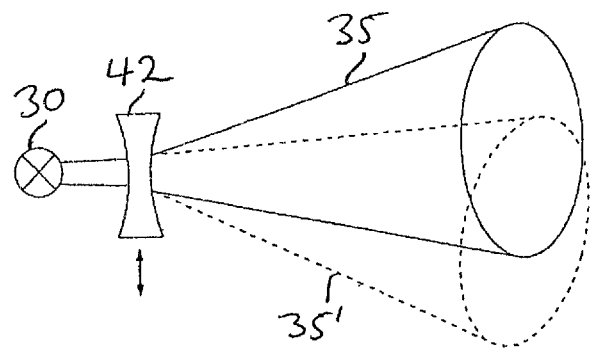
FIG. 5 shows an irradiation arrangement according to a further embodiment in a schematic manner.

In the embodiment of FIG. 4 a tiltable/pivotable mirror 40 is used to change the direction of light cone 35 which is emitted from light source 30, for example to the light cone 35' shown in a dashed manner. In the embodiment of FIG. 5 instead of mirror 40 for adjusting the direction of light cone 35 an imaging element which may be laterally decentered, in this example a lense 42, is used. Through translating lense 42 in a direction particular to the beam direction as indicated by an arrow the direction of light cone 35 may also be changed. It is to be noted that such a system is not limited to a single translatable imaging element, but also a plurality of translatable imaging elements like lenses may be provided. Also instead of a translation perpendicular to the beam direction a tilting or other movement of such imaging elements is possible. Also a combination of an imaging element which can be decentered laterally with a tiltable/pivotable mirror is possible.

In such a system in which a light cone of one or more light sources covers only a part of the spatial area in which a position determination is to be performed, it is necessary to receive information regarding the position of a retroreflector or other object to be illuminated to be able to direct the light cone correspondingly. In an embodiment like the one shown in FIG. 1 this determination may for example be effected through sensors in the axes of robot 2, through which a determination of the position of retroreflector 25 is possible. This position determination is generally less exact as the position determination which at the end is performed through the optical measurement, but is, however, generally sufficient to align the light cone correspondingly. The expansion of the light cone may then be chosen according to the measurement accuracy of the sensors in the robot. In case no such sensors are present, also data from a control program for controlling the movement of the robot may be used.

Finally, once the position has been determined through the optical measurement—for example by scanning the space volume with the light cone(s)—the position of the optical measurement itself may be used for tracking. In case the optical measurement indicates that the retroreflector moves towards the border of the corresponding light cone, the light cone is redirected accordingly. Also in this case the size of the light cone, i.e. the expansion, may be chosen in a suitable manner to ensure a sure tracking, i.e. a certain distance from the center of the light cone to the border of the light cone, to be able to capture a movement within the light cone in good time.

A further possibility is to evaluate, besides the phase of the reflected light for position determination as described above, in addition the amplitude of the reflected light and to perform the tracking such that the amplitude is maximized or that the amplitude reaches at least a predetermined minimal value, respectively. An embodiment of a corresponding device is shown in FIG. 6.

Figure 6:
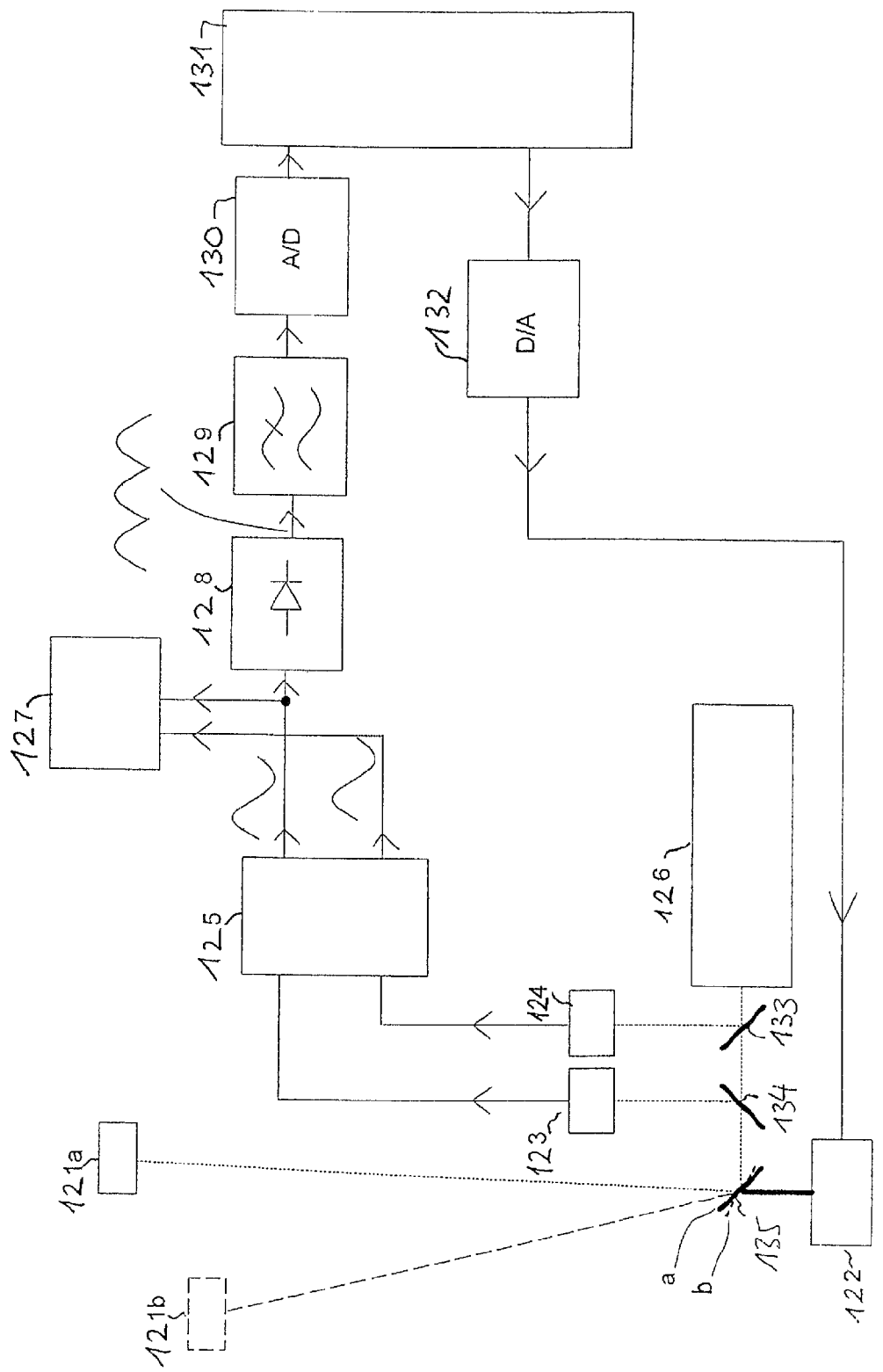
FIG. 6 is a schematic representation of a device according to an embodiment.

The embodiment of FIG. 6 can be implemented as an addition of the embodiment of FIG. 1, but also can be implemented independently therefrom.

In the embodiment of FIG. 6 a light source 126, for example a short-pulse laser as already described above, generates a light beam. Through a beam splitter 133 a part of the light beam is guided to a reference detector 124, the function of which corresponds to the function of the reference detectors 11, 12 of FIG. 1. A remaining part of the light cone is guided to a mirror 135 which is movable using a mirror drive 122 to guide the light beam to a retroreflector 121. While in FIG. 6 only a single mirror is shown in embodiments for a three-dimensional determination of a position correspondingly three mirrors and correspondingly more beam splitters may be present, or for two-dimensional position determination two mirrors and two beam splitters, in order to guide three or two light beams, respectively, to retroreflector 121, as has already been explained with reference to FIG. 1. In other embodiments additional light sources for generating additional light beams may be provided.

As an example in FIG. 6 two positions a and b of mirror 135 are shown, corresponding to positions 121a and 121b of the retroreflector. It is to be noted that the light beam may be expanded by an optic (not shown) upstream or downstream of mirror 135, as also already explained.

Light reflected from retroreflector 121 is guided via mirror 135 and a beam splitter 134 to a detector 123. A measurement amplifier and mixer 125 processes the signals of detectors 123 and 124 and forwards the respective processed signals to a phase measurer 127, which determines a phase difference of the signals from which as already explained the position of retroreflector 121 may be deducted. The mixer of measurement amplifier/mixer 125 in the shown embodiment serves to downconvert the signal output by detector 123, which has a frequency which, when using a short-pulse laser, corresponds to the frequency of the short-pulse laser, to an intermediate frequency.

Furthermore, a signal processed by measurement amplifier and mixer 125 of detector 123 is rectified by a rectifier 128 and smoothed by a low-pass filter 129. The such generated signal is transformed by an analog-to-digital converter 130 to a digital signal, the value of which is indicative of the amplitude of the signal detected by detector 123. This digital signal is provided to an evaluation unit 131, for example a microprocessor or a computer. The evaluation unit 131 may be the same evaluation unit which also determines the phase difference detected by phase measurer 127 or evaluated.

Depending on the such captured signal amplitude at detector 123, evaluation unit 131 then via a digital-to-analog converter 132 controls mirror drive 122.

For example at first, for example at start-up of the device, in a mode of operation the mirror 135 is moved continuously over its complete angular area, for example at first in one axis, the measurement signal is detected and stored in a table with the corresponding position, for example angular position, of mirror 135. After this "search run" the position, i.e. the angle, of mirror 135 is adjusted such that it assumes the position in which the maximum of the amplitude has been detected. In other embodiments the initial position of the retroreflector is known, and the "search run" is omitted.

During operation then in a second mode of operation through continuously or interval-like monitoring of the signal output by analog-to-digital converter 130, the position of mirror 135 is adjusted such that the measurement signal, i.e. the amplitude of the signal received at detector 123, is maximized and/or reaches a predetermined threshold value.

While in the embodiment of FIG. 6 a signal of the measurement amplifier/mixer 125 is evaluated, in other embodiments also directly the signal output by detector 123 may be evaluated and its amplitude may be determined.

In yet other embodiments additional detectors are used to capture a movement of the retroreflector and to adjust the light cone accordingly. Corresponding examples will now be explained with reference to FIGS. 7-9.

In FIGS. 7 and 8 an embodiment of a tracking arrangement according to the invention with a detector arrangement is shown. FIG. 7A shows a view of the tracking arrangement, FIG. 7B shows a partial view of a used retroreflector/detector arrangement and FIG. 8 shows a block diagram of a corresponding evaluation/control arrangement. In the embodiment of FIG. 7A light, for example laser light of a short pulse laser, is generated by a light source 51 and is guided via a mirror 59 to a retroreflector 53, as already described above. Light source 51 may comprise the light source per se, for example a laser, as well as an optic for cone-shaped expansion of the generated light source or other optical elements as for example shown in FIG. 1.

Mirror 59 may be moved by a mirror drive 57 to change the direction of the light cone generated by light source 51 and in particular to guide the light cone onto the retroreflector 53. At retroreflector 53 additionally a detector arrangement 54 is provided which in the embodiment shown has the form of a quadrant diode or a quadrant detector, respectively. This arrangement is shown in FIG. 7B in more detail. In the middle the retroreflector 53 is arranged, and surrounding it four quadrants 54a-54d of the quadrant detector 54, for example four generally independent photodiodes, are arranged.

Through the four quadrants 54a-54d of the quadrant detector a movement of the light cone relative to the retroreflector 53 may be captured before retroreflector 53 leaves the light cone and the light cone may be adjusted accordingly. Such a relative movement may for example be caused by a movement of the retroreflector 53 which may be mounted to a robot arm as shown in FIG. 1.

For example an attenuation of light detected by quadrant 54a with constant light received by quadrant 54c indicates that the light cone moves relatively to retroreflector 53 towards quadrant 54c such that the light cone may be adjusted accordingly.

A corresponding control arrangement is schematically shown in FIG. 8. Here a control arrangement 58 which for example may be implemented in form of a programmable logic chip or a fixed hardware receives signals from quadrants 54a-54d and by combining these signals as described above using an example determines a movement direction of the light cone relative to retroreflector 53. Based on the determined movement direction mirror drive 57 is controlled to move mirror 59 for adjustment of the light cone to ensure that retroreflector 53 is always covered by the light cone.

In the embodiment of FIGS. 7 and 8 instead of a quadrant diode also another multiple detector arrangement may be used, wherein also less than four single detectors (quadrants), but also more than four single detectors may be provided.

A further embodiment of a tracking arrangement according to the invention is shown in FIG. 9. FIG. 9A shows a schematic view of the tracking arrangement, and FIG. 9B shows a detailed view of a retroreflector 53 with light emitting diodes arranged around it.

As in the embodiment of FIGS. 7 and 8 in the embodiment of FIG. 9A a light source 51, a mirror 59, a mirror drive 57 as well as a retroreflector 53 are provided. The function of these elements corresponds to the one already explained with reference to FIGS. 7 and 8.

In the embodiment of FIG. 9 light sources, in the example shown four light emitting diodes 56a-56d, are arranged around retroreflector 53. The number four is to be taken merely as an example, and also another number of light emitting diodes may be provided. Furthermore, in other embodiments other light sources than light diodes, for example laser diodes, may be used.

Furthermore, the embodiment of FIG. 9 has a beam splitter 52 with which light emitted from light emitting diodes 56a-56d and light reflected from retroreflector 53 is guided via mirror 59 and beam splitter 52 to a detector arrangement 55. Detector arrangement 55 is configured to detect light emitted by light emitting diodes 56a-56d. In the embodiment of FIG. 9 light emitting diodes 56a-56d may be for example continuously emitting light emitting diodes. In such a case detector arrangement 55 may for example comprise a digital camera which captures an image corresponding to the "area of view" of the light cone emitted by light source 51, and determine through image processing the position of the light emitting diode and to adjust the light cone correspondingly if appropriate.

In this way, similar as on the basis of the quadrants of the quadrant detector in the embodiments of FIGS. 7 and 9, a movement of the light cone relative to retroreflector 53 may be recognized on the basis of detected light of light emitting diodes 56a-56d before retroreflector 53 leaves the light cone.

In another embodiment the light of light emitting diodes 56a-56d is different from light of light source 51, for example by having a different wavelength and/or a different modulation. Additionally, in an embodiment the light emitted from light diodes 56a-56d differs, for example by using a different modulation and/or a different light wavelength for each light emitting diode.

In such an embodiment the light of the light diodes may be detected separate from each other, for example on the basis of the different modulation or different wavelength mentioned above. Furthermore, the detector arrangement 55 may serve for detecting light reflected from retroreflector 53 and therefore for determining the position as described above. For this, however, also a separate detector arrangement may be provided.

If in this embodiment for example in detector arrangement 55 light of light diode 56a is not detected or only detected in an attenuated manner, and light of light diode 56 continues to be detected in full strength, this indicates a movement of the light cone relative to retroreflector 53 towards light diode 56c away from light diode 56a, and a corresponding (not shown) control corresponding to the control shown in FIG. 8 may then control mirror drive 57 to move mirror 59 to adjust the light cone correspondingly.

In the embodiments of FIGS. 7 to 9 besides the reflector a detector (in case of the embodiments of FIGS. 7 and 8) or markers (in case of the embodiment of FIG. 9) are provided to facilitate the tracking. In other embodiments a corresponding detector may also be provided on the side of the respective light source. Corresponding embodiments will now be described with reference to FIGS. 10 and 11.

In FIG. 10 an illumination arrangement according to a further embodiment of the present invention is shown. FIG. 10A is an overview of the illumination arrangement, FIG. 10B shows an example for a usable detector and FIG. 10C illustrates an impinging of a light beam in different positions on the detector of FIG. 10B.

As shown in FIG. 10A, in the embodiment of FIG. 10 a light beam, for example a laser beam, is fed via a light guide 150, for example a glass fiber. When leaving the light guide 150, the light beam 151 expands, for which a corresponding optic (not shown) may be provided, and passes through a centrically located hole of a detector 152. Detector 152 will be described in more detail later.

The beam then impinges on a movable mirror 153 and is guided as a beam 156 reflected from mirror 153 to a reflector 157, for example a retroreflector. As indicated by solid lines 156 only a part of the light beam impinges on the reflector 157 or, in other words, light beam 156 is expanded such that it illuminates an area larger than a corresponding sectional area of reflector 157.

Light reflected from reflector 157 in FIG. 10A generally is represented in dashed lines. First, the light beam is reflected back from reflector 157 to mirror 153 as light beam 158, wherein as shown by the dashed lines only a part of the light beam arrives at mirror 153. From mirror 153 the light is finally guided to detector 152. Depending on the signal detected by detector 152 a control 155 controls mirror 153 to move the same. Detector 152 and mirror 153 may be arranged in a measurement head 154 of a corresponding measurement device. It is to be noted that for evaluating the reflected light in order to determine the position a further detector may be present, for example the detectors 13 or 14 of FIG. 1 or phase measurer 127 of FIG. 6. In other embodiments detector 152 additionally may be used for the detection for the determining of the position.

Detector 152 in particular may be a quadrant detector, for example a quadrant diode, as shown in FIG. 10B. Quadrant detector 152 shown in FIG. 10B has four segments A, B, C and D which are arranged around a circular opening through which light beam 152 passes. In other embodiments instead of a quadrant diode also other position-sensitive detectors, like a position sensitive device (PSD), may be used, or more or less than four sectors may be used.

In case the beam 159 reflected back from mirror 153 impinges centrally on detector 152, this corresponds to the situation designated in FIG. 10C with 161. In this case the four quadrants A, B, C and D are evenly illuminated and output a signal with equal strength. In case through movement of the reflector 157 or the measurement head 154 light beam 159 moves on detector 152 a situation as designated with 160 in FIG. 10C may result. In this case segment B outputs the strongest signal, segment C the weakest signal and segments A and D an intermediate signal. In this case control 155 may control mirror 153 such that the situation designated with 161 in FIG. 10C is restored if possible.

In the embodiment of FIG. 10 detector 152 is arranged in the beam path of beam 151. In other embodiments a beam splitter may be provided to couple light beam 159 or a part hereof out of the beam path and to guide it to a corresponding detector. A corresponding embodiment is shown in FIG. 11.

Here a light guide 170, a mirror 173, a measurement head 174, a reflector 177 and a control 175 correspond to the corresponding elements in FIG. 10A, i.e. to light guide 150, mirror 153, measurement head 154, reflector 157 and control 155 and will not be described again. In a similar manner a beam 171, a reflected beam 176, a beam 178 reflected back from reflector 177 and a beam 179 reflected again by mirror 173 correspond to beams 151, 156, 158 and 159, respectively of FIG. 10 and also therefore will not be described again in detail.

In the embodiment of FIG. 11 no detector 152 as in FIG. 10A is positioned in the beam path. In stead in the embodiment of FIG. 11 as shown in FIG. 11A a beam splitter 182 is provided which couples light beam 179 out of the beam path and guides it to a detector 172, which generally has the same function as detector 152 of FIG. 10A.

As shown in FIG. 11B also detector 172 may be a quadrant detector as detector 152 of FIG. 10B. Also here a central area may be left free, wherein in case of FIG. 11 the size of this central area does not have to be adapted to beam 151 or 171, respectively, but can be chosen basically freely. Also in this case the central area may be opaque. In other embodiments the central area of detector 172 may also be omitted or basically omitted.

As already explained with reference to FIG. 10C through detector 172 a deviation of the light beam from a central incidence on the detector may be determined. Here light beams 180 and 181 which are shown as an example in FIG. 11C correspond to light beams 160 and 161 of FIG. 10C. In particular, if impinging in a position as labeled 180 in FIG. 11C a signal of a segment B is stronger than a signal of a segment C of detector 172, whereas signals of segments A and B are therebetween. In this case control 175 may control mirror 173 to restore the state 181 of FIG. 11C, in which all segments deliver basically equal signals.

Apart from the differences explained above, all possibilities for variations and explanations which were given referring to FIG. 10 also apply to FIG. 11.

In the embodiments explained so far it has been assumed that a reflector, for example reflector 25 of FIG. 1, is mounted to a movable object, the position of which is to be determined, and the reflector is irradiated by a plurality of light sources and the respective reflected light is measured, as explained with reference to FIG. 1. In general also the reverse arrangement is possible, i.e. at a movable object, for example in a measurement head, devices for emitting one or more light beams are provided, with which light is irradiated on stationary reflectors. A corresponding embodiment will now be described with reference to FIG. 12.

Figure 12:
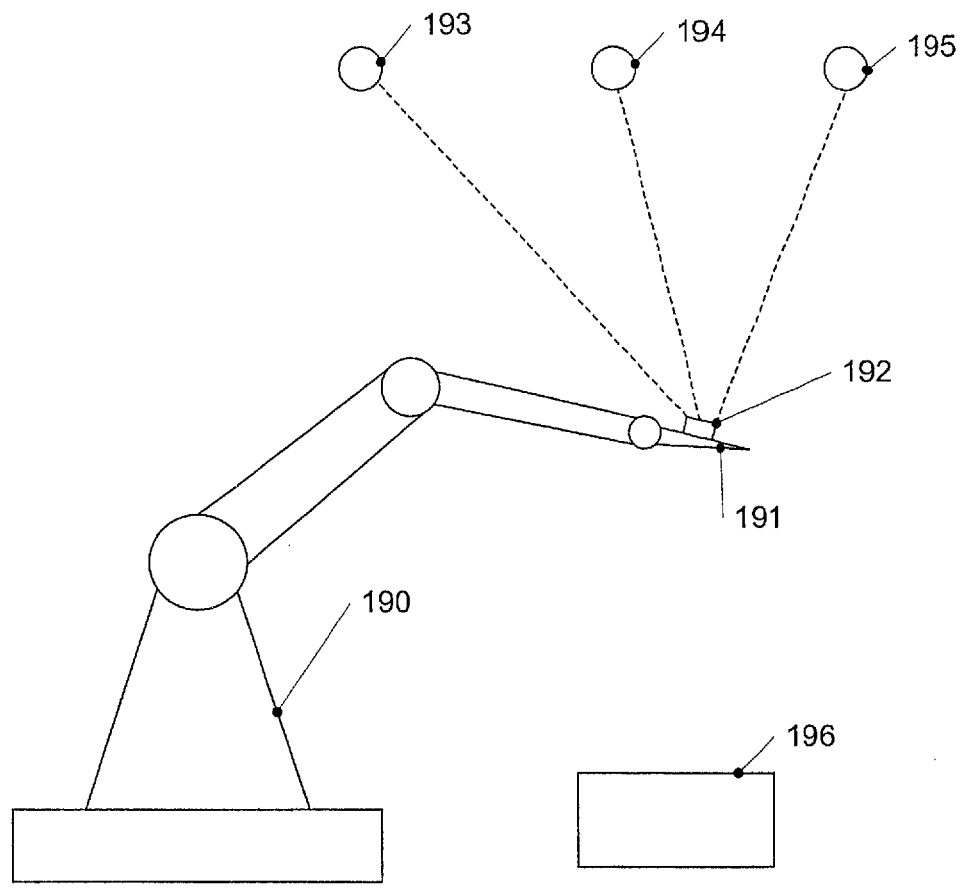
FIG. 12 is a schematic representation of a device according to a further embodiment.

In FIG. 12 a robot arm 190 which basically corresponds to robot arm 2 of FIG. 1 is shown. Robot arm 190 has a plurality of axes around which it may be turned or pivoted. At a last member 191 of robot arm 190 similar as explained with reference to FIG. 1 a sensor or a tool may be mounted. The position of the last member 191 is to be determined, i.e. last member 191 is an object the position of which is to be determined.

For determining the position a measurement device 192 is mounted to the last member 191 which through optical measurement measures distances to stationary retroreflectors 193, 194 and 195 as indicated by dashed lines. In particular, measurement device 192 may set light beams to reflectors 193, 194 and 195 and then detect light reflected back. Through determination of the distances to the three retroreflectors 193, 194 and 195 which are not arranged along a straight line then a determining of the position in three spatial directions is possible by trilateration. The evaluation of the detected light and the determining of the position may be performed by an evaluation unit 196.

The distance measurement basically may be effected as explained with reference to FIG. 1 and will not be explained again.

Measurement device 192 may measure the retroreflectors 193, 194 and 195 one after the other, i.e. sequentially. In this case again a guiding arrangement as arranged with reference to FIGS. 2-11 may be provided to guide the light for example by using a mirror or another optical element in the direction of the respective retroreflector.

In other embodiments measurement device 192 comprises for example three separate measurement arrangements, wherein each measurement arrangement measures one of the retroreflectors. Instead of retroreflectors as already explained also other reflecting or scattering elements may be provided.

Figure 13:
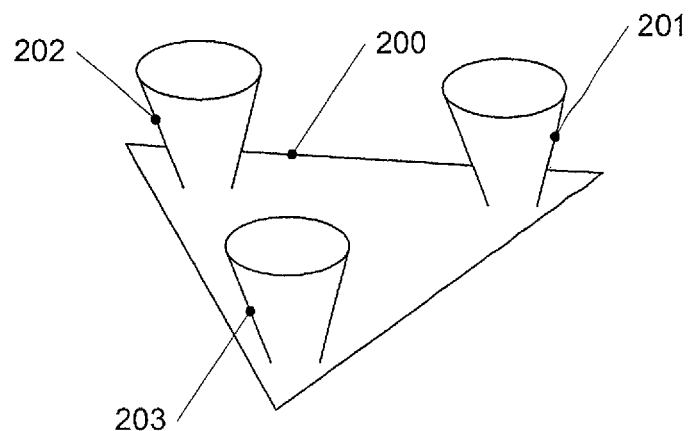
FIG. 13 is a representation of a measurement device which may for example be used with the embodiment of FIG. 12.

An example for a measurement device with three measurement arrangements is schematically shown in FIG. 13. In the example of FIG. 13 three measurement arrangements 201, 202, 203, which are represented by light cones, are arranged in a triangular form 200. It is to be noted that to achieve this the measurement arrangements 201, 202 and 203 may be arranged on a triangular plate, but may also be arranged on another suitable carrier. The light cones of measurement arrangements 201, 202 and 203 may be pivotable to irradiate a respective reflector, for example one of reflectors 193, 194 and 195. To achieve this again, each of the measurement arrangements 201, 202 and 203 may be provided with a light guide arrangement as for example discussed with reference to FIGS. 2-11.

In an embodiment the light beams emitted from measurement arrangements 201, 202 and 203 may be marked in different manners to enable a separation of the reflected light. For example different modulations, for example different pulse rates, may be used, or different wavelengths together with corresponding filters may be used.

Figure 14:
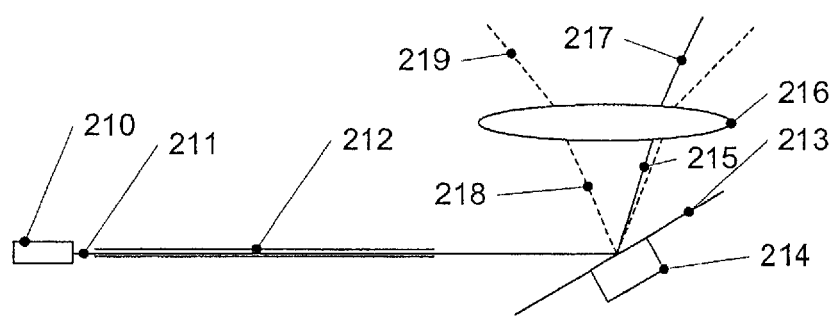
FIG. 14 shows an irradiation arrangement according to a further embodiment.

A further embodiment of a suitable measurement arrangement with a light guide device is shown in FIG. 14. The measurement arrangement of FIG. 14 may not only be used in the embodiment of FIG. 12, but may for example also be employed in the embodiment of FIG. 1.

In the embodiment of FIG. 14 a light source 210, for example a laser, generates a light beam 211. Light beam 211 is guided via a light guide 212, for example a glass fiber, to a mirror 213. Through the use of light guide 212 light source 210 may be located remote from mirror 213. For example in the embodiment of FIG. 12 mirror 213 may be positioned in measurement apparatus 192, whereas light source 210 may be even located outside robot arm 190. Light source 210 in particular as already discussed may be a short-pulse laser.

Mirror 213 in the embodiment of FIG. 14 again is a movable mirror which is movable via an arrangement 214. For example mirror 213 may be a microelectromechanical system, i.e. a MEMS-mirror. In such mirror mechanical elements together with an actuator are integrated for example on a silicon substrate.

In the embodiment of FIG. 14 mirror 213 for example may be pivotable in two perpendicular spatial directions. Therefore, a reflected beam 215 may be adjusted within the limits which in FIG. 14 are represented by dashed lines 218, for example to illuminate a desired retroreflector or other reflectors.

In MEMS-mirrors the adjustment area of the reflected beam 215 is typically in the range of ±10° around a center position.

To enlarge this adjustment area a wide angle optic 216 may be provided which in FIG. 14 is represented as a simple lense but which may comprise a plurality of lenses or other optical elements. Thus, an adjustment area of the beam 217 which passed through the optic 216 may be enlarged, as indicated by dashed lines 219, to be able to cover a larger angular area.

The embodiments of FIGS. 7-11 and 14 serve merely as example and also other detector arrangements, for example detectors on the basis of an analysis of an image of the spatial area in which the position determination is to be performed captured by a corresponding digital camera may be used.

In the embodiments of FIGS. 7-11 and 14, but also in other embodiments the light cone may for example be such that it illuminates an area which is 50-100% larger than the area of the correspondingly used retroreflector. However, further expanded light cones may also be used.

As already mentioned, tracking arrangements which were explained with reference to FIGS. 2-11 and 14 may for example be employed in the embodiment of FIG. 1 or FIG. 12, but they can also be used in other devices in which a two-dimensional or three-dimensional position of an object, for example an object provided with a retroreflector, is determined through illuminating the object with radiation, for example laser radiation, and analysis of the reflected light.

By optical means not only the position of an object in a spatial area may be determined, also a three-dimensional surface may be measured based on similar principles. An embodiment of such a device will now be explained with reference to FIG. 15.

Figure 15:
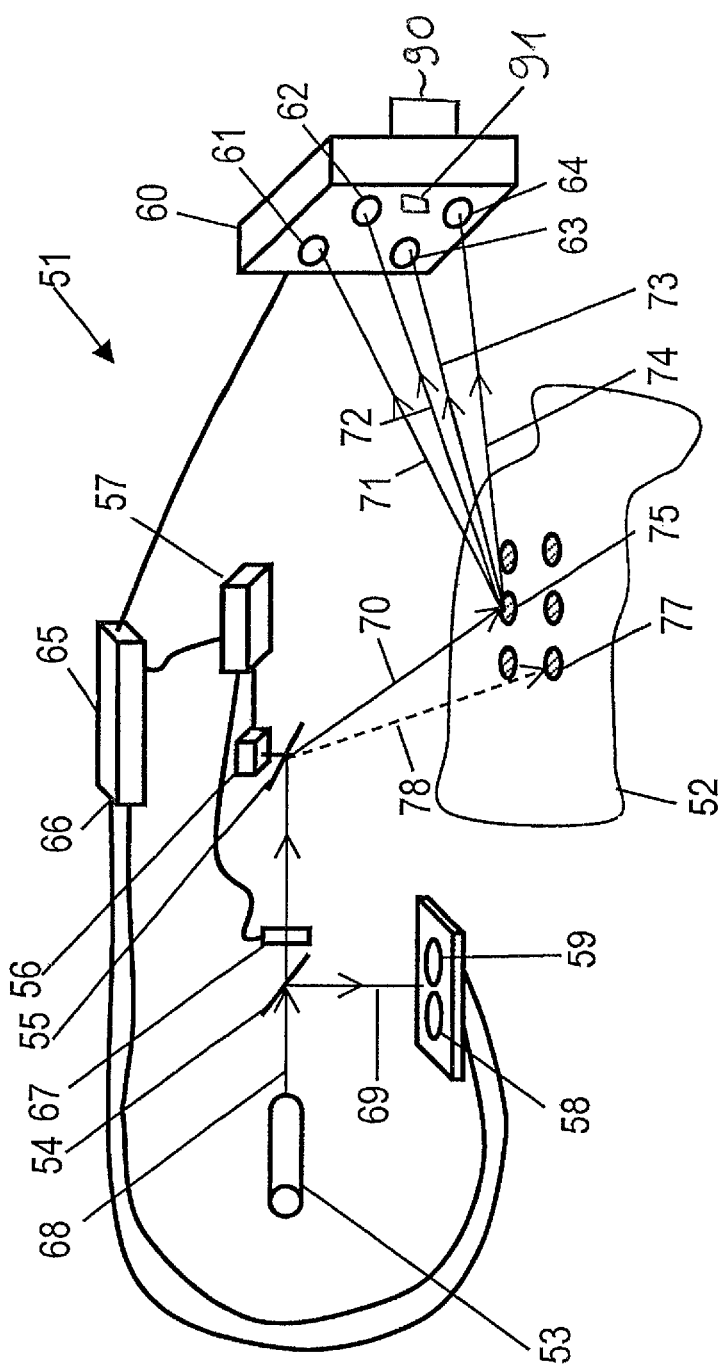
FIG. 15 shows a device for surface measurement according to an embodiment of the present invention.

FIG. 15 is a schematic representation of a device 51 for measuring a surface 52 according to an embodiment.

Device 51 comprises a light source 53 which generates a sequence of short light pulses with a repetition rate, a light guiding arrangement which comprises an adjustable mirror 55 and an associated adjustment arrangement or actor 56, a detector arrangement 60 with a plurality of photo detectors 61-64 and an evaluation circuit 65. From light source 53 a sequence of light pulses is radiated in a light beam on mirror 55. Depending on the position of mirror 55 the sequence of light pulses is guided to a surface area 75 of surface 55 as light beam 70. A characteristic size of surface area 75 is determined by a diameter of light beam 70, i.e. of the sequence of light pulses, when impinging on surface 52. When light beam 70 is focused on surface 52, the diameter of surface area 75 in an ideal case may basically be limited by diffraction.

The sequence of light pulses is scattered at surface area 75. Photo detectors 61-64 of detector arrangement 10 receive light signals 71-74 which respectively comprise a part of the sequence of light pulses scattered by surface area 75. Photo detectors 61-64 detect the received light energy or light intensity as a function of time. Evaluation circuit 64 determines a phase position for the light signals received by photo detectors 61-64 relative to the illuminating sequence of light pulses. The phase position has a relationship to the time delay of the light pulses from surface area 75 to photo detectors 61-64 and therefore to the distance of the surface area 75 to the detectors. In this way the position of surface area 75 may be determined. The determination of the phase position by evaluation circuit 75 may for example be based on signal components of the light signals received at photo detectors 61-64 which have a frequency beam which is a multiple of the repetition rate.

Device 51 further comprises two reference signal detectors 58, 59 on which the sequence of light pulses is guided in a partial beam 69 by a beam splitter 54 as a reference signal. For simplicity's sake here a terminology is used that both in the light beam transmitted from beam splitter 54 to mirror 55 and in the partial beam 69 guided by beam splitter 54 to reference signal detectors 58, 59 the sequence of light pulses is radiated, wherein it is clear that only a part of the light intensity of each light pulse is guided in partial beam 69 to reference signal detectors 58, 59 and in partial beam 70 to surface 52, respectively. Reference signal 69 is captured by both reference signal detectors 58, 59 and is provided to the evaluation circuit 65 and a reference signal input 66. Possibly a beam expander may be arranged in the path of partial beam 69 to ensure that partial beam 69 is captured by both reference signal detectors 58, 59. The reference signals provided by each of reference signal detectors 58, 59 is used by evaluation circuit 56 to determine the phase position of the sequence of light pulses scattered by surface area 75.

Device 51 further comprises a computing unit 57 which is coupled with evaluation circuit 65 to determine the position of the surface area 75 based on the determined phase positions.

The determination of the position of surface area 75 here means the determination of three coordinates of a point of surface area 75. As surface area 75 ideally has small dimensions which are determined by the diameter of incident light beam 70, for simplicity reference will be made to the position of the surface area even if this itself has a certain small dimension.

To reduce the dimension of the surface area 75 and to increase the later resolution when measuring surface 52, an adjustable focusing optic 67 is provided in the beam path between beam splitter 54 and mirror 55. Focusing optic 67 is controlled by computing unit 57 such that light beam 70 is focused on surface 52, in an ideal case focused at the diffraction limit.

As in device 51 the position of the surface area 75 is determined based on the light signals 71-74 captured by photo detectors 61-64 and on reference signal 69 captured by reference signal detectors 58 and 59 for determining the position of surface area 75 the angular position of mirror 55 needs not be exactly known in device 51. Further through use of a detector arrangement 60 in which a number of photo detectors 61-64 is used which is greater than the number of coordinates of surface area 75 to be determined it is possible that the position determination may be performed in a robust manner even if the exact position of mirror 55 is not known.

Computing unit 57 is coupled with actor 56 of mirror 55 to adjust the position of mirror 55 by controlling actor 56. By adjusting mirror 55 the sequence of light pulses may be guided as light beam 28 to a different surface area 77 to determine the position of the same. To scan surface 52 mirror 55 may be gimballed. Because of the robustness of the position determination in device 51 also other more simple deflecting systems may be used, for example a pair of mirrors which are pivotable or rotatable about two orthogonal axes. Instead of deflecting mirrors also other optical elements may be used for scanning the surface, for example a deflecting prism or the like.

As the positions of the various surface areas are determined sequentially, wherein the position determination for each surface area is performed in the same manner, in the following only the position determination for one surface area is described in more detail. For measuring the surface, the positions of a plurality of surface areas is determined in the described manner sequentially.

Light source 53 of device 51 generates for example an optic signal, the intensity of which is modulated with a periodic function, wherein the modulation has a fundamental frequency f0 as well as pronounced components of harmonics of the fundamental frequency f0, i.e. pronounced frequency components with frequencies with are multiples of f0. Such a signal is for example generated by a short-pulse laser which generates a sequence of light pulses with well-defined delay T0=1/f0, i.e. with a repetition rate f0, wherein the duration of each pulse is short compared to the delay T0 between successive pulses.

The duration of each light pulse may be very small compared to the delay T0 between successive light pulses, for example of the order $1 \cdot 10^{-5}$. Repetition rate f0 and duration of each pulse of light source 53 may be selected suitably depending on a desired measurement accuracy of the position determination, an initial uncertainty regarding the position of the surface area, the frequency of the signal component of the light signal detected at photo detectors 61-64 for which the phase difference is determined or depending on further factors. In case for determining the phase difference the nth harmonic of f0 is to be used, the duration of each light pulse at the delay T0 between successive light pulses is chosen such that the sequence of light pulses output by light source 53 has a sufficient spectral weight at the frequency $n \cdot f0$. The pulses may be a sequence of rectangular pulses, but also other suitable pulse forms may be chosen, for example the square of a hyperbolic secans or a Gaussian function.

A suitable sequence of light pulses may be generated by diverse lasers which are configured for generating short light pulses. In particular optical frequency synthesizers may be used. For example an electrically pumped diode laser, for example a quality-switched laser, a gain-switched laser, an actively or passively mode-coupled laser or a laser with hybrid mode coupling or a mode-coupled surface emitting laser with vertical resonator (vertical-cavity surface emitting laser, VCSEL) may be used as light source 53. Also an optically pumped laser, for example a passively mode-coupled surface emitting laser with external vertical resonator (vertical external cavity surface emitting laser, VECSEL) or a laser based on photonic crystal fibers (photonic crystal fiber laser) may be used as light source 53. Examples for pulse durations of light source 53 are in a range of 100 fs and 100 ps. Examples for repetition rates are in a range from 50 MHz to 50 GHz. Examples for mean power are in a range from 1 mW to 10 W. Examples for values for the pulse jitter are between 10 fs and 1 ps effective value (square mean value).

As shown in FIG. 15 a partial beam of the sequence of light pulses emitted from light source 53 is guided via beam splitter 54 as reference signal 69 to reference signal detectors 58, 59. If required in the beam path from beam splitter 54 to reference signal detectors 58, 59 an optical element for beam splitting, in particular a beam splitter, may be provided to ensure that the partial beam 69 impinges both on reference signal detector 58 and on reference signal detector 59. A further partial beam 70 is guided to surface area 75 of surface 52 via mirror 55. Here it is assumed that the surface area on which the sequence of light pulses is irradiated has light scattering properties. The sequence of light pulses is scattered by surface area 75 in a plurality of spatial directions. The scattered light comprises also the sequence of light pulses which is scattered as light signal 71-74 in direction of photo detectors 61-64. Photo detectors 61-64 in detector arrangement 10 are arranged such that none of the photo detectors is positioned on a straight line which goes through a surface area 75, 77, the position of which is to be determined and through a further one of the photo detectors. In the shown arrangement in which the four photo detectors 61-64 are arranged basically in a plane such that never more than two of the photo detectors 61-64 are located on an arbitrarily chosen straight line this can be easily obtained, for example by arranging detector arrangement 60 in a distance from surface 52 in an angle different from 0° to all connection vectors between surface points and detector arrangement 60. Based on the phase positions of the signals captured at the different photo detectors 61-64 in this case the position of surface area 75 may be determined as a sufficiently high number of mutually independent phase positions.

Light signals 71-74 are captured by photo detectors 61-64. Because of the light pulses generated with well-defined repetition rates a signal portion which is based on scattering of the sequence of light pulses at the surface area 75 may be determined through suitable filtering during signal processing through evaluation circuit 65 such that in the following components which are not generated by light scattered in surface area 75 in the direction of photo detectors 61-64 is not discussed further. Both photo detectors 61-64 and reference signals detectors 58, 59, which are also implemented as photo detectors, capture a light energy as a function of time. The different optical path length of a light pulse to reach reference signal detectors 58, 59 on the one hand and photo detectors 61-64 after scattering at surface area 75 on the other hand lead in each case to a time delay $\tau_1$, $\tau_2$, $\tau_3$ and $\tau_4$, respectively, between the arrival of one and the same light pulse at one of detectors 61-64 and at reference signal detectors 58, 59 which is equal to the difference in optical path length of the beam path divided by speed of light c. As typically only a small portion of the light 70 irradiating surface 52 is scattered by surface area 75 in direction of one of photo detectors 61-64, the signal at photo detectors 61-64 is attenuated compared to the reference signal at reference signal detectors 58, 59.

The path length difference for each of photo detectors 61-64 is given by the difference between optical path length from beam splitter 54 to mirror 55 to surface area 75 and further to the respective photo detectors 61-64 and the optical path length from beam splitter 54 to reference signal detectors 58, 59. The first mentioned path from beam splitter 54 via mirror 55 to surface area 75 and further to the respective photo detectors 61-64 depends on the position of the surface area 75 to be determined, while the distance from beam splitter 54 to reference signal detectors 58, 59 is determined by the device geometry and can be assumed as known. By measuring the time delays $\tau_1$, $\tau_2$, $\tau_3$ and $\tau_4$, respectively, between the light signals 71-74 captured at photo detectors 61-64 and the reference signal 69 captured by reference signal detectors 58, 59, the optical path length covered by the light pulse between beam splitter 54 and each of photo detectors 61-64 may be determined.

Photo detectors 61-64 as well as reference signal detectors 58, 59 are coupled with evaluation circuit 65 which determines a phase difference between light signals 71-74 and reference signal 69.

Evaluation circuit 65 then determines the position of the respective measured portion of the surface based on the phase differences.

In order to collect as much as possible of the light scattered by the surface in front of detectors 61-64, a collecting lense or other collecting optic may be mounted. To prevent that through this focusing for example with a slanted incidence of light a focus spot leaves the sector area and therefore no detection is possible any longer, the detector arrangement 60 in the embodiment of FIG. 15 may be tilted by a detector drive 90. In another embodiment for each single detector 61-64 a detector drive is provided such that the detectors may be tilted individually. Detector drive 90 may for example comprise a so-called voice coil motor or voice coil actor. Such actors are also referred to as plunger coils and have a small installation space. However, other actors or motors may be used as detector drive as well.

In case trough tilting a significant position change of single detectors is caused, for example when the complete detector arrangement is tilted, this tilt may be taken into account by evaluation circuit 65 additionally.

To determine a direction of incident light beams in the embodiment of FIG. 15 a further detector 91 is provided which determines a direction of the incident light and on the basis of which detector drive 90 or individual detector drives of the individual detectors may be controlled accordingly.

The function of detector tilter 90 as well as of the further detector 91 will be explained in the following referring the specific embodiments. It is to be noted that the embodiment of FIG. 15 only represents one possibility in which such a detector tilter may be implemented. Generally such a detector drive for tilting a detector, i.e. for aligning a detector in direction of an incident light beam, may be used in devices for surface measurement in which a light beam is guided to a surface and the reflected light is detected.

Figure 16:
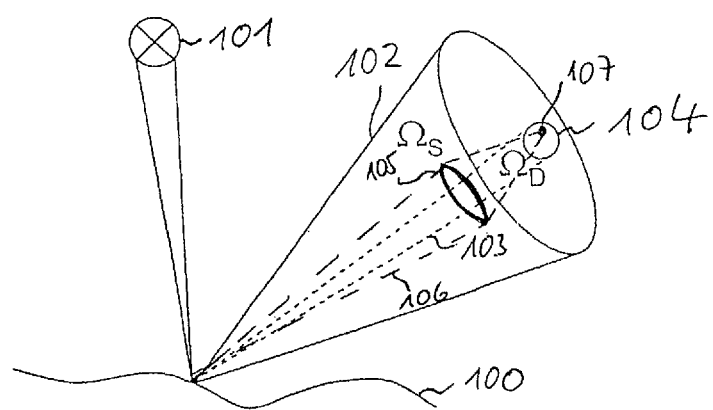
FIG. 16 shows a schematic diagram for illustrating principles of some embodiments of the present invention.

FIG. 16 shows a schematic picture for further illustration of a tracking of a detector depending on an incidence direction of a light beam reflected from a surface as explained briefly above for the embodiment of FIG. 15. In the simplified representation of FIG. 16 a surface 100 is illuminated by a light source 101 in a focused manner, wherein light is reflected in a solid angle $\Omega_S$ corresponding to a light cone 102. Without further measures only the light in a solid angle $\Omega_D$ corresponding to a partial light cone 103 impinges on a detector 104. Detector 104 for example may be one of detectors 61-64 of the embodiment of FIG. 15.

To increase the light efficiency as already explained a collecting lense (not shown) may be arranged in front of detector 104 which focuses a greater part of light cone 102 than partial light cone 103 onto detector 104. In this way the signal-to-noise ratio of the detection may be improved.

Instead of a collecting lense generally a collecting optic may be used, collecting lense 105 from FIG. 16 merely serving as an example.

Collecting lense 105 decreases the diameter of a spot 107 on detector 104 corresponding to the numerical aperture of collecting lense 105. Furthermore, such a collecting lense or other collecting optic causes the position of spot 107 on detector 104 to change with a variation of the incident angle of light on lense 105. A translation of the spot Δs in paraaxial approximation is equal to $$\Delta s = f \tan \alpha, \quad (1)$$

wherein f is the focal length of collecting lense 105 and α is the angle of incidence; tan indicates the tangens function. Depending on the realization of the detector the area of detector 104 may be relatively small, for example when fiber-coupled detectors are used, i.e. the received light is coupled in a glass fiber and is thus transferred to the detector itself. In such a case as already briefly mentioned when describing FIG. 15 a change of incident angle or a slanted incident angle which may for example result when scanning sample surface 100 with the light beam may cause the spot 107 to move beyond the edge of detector 104 which interrupts the measurement.

As already explained with reference to FIG. 15 in an exemplary manner in embodiments of the present invention the direction of incident light is determined and a used detector or a used detector arrangement is adjusted accordingly, for example tilted according to the angle of incident light, to ensure that light bundled by a collecting optic like collecting lense 105 of FIG. 5 impinges on the corresponding detector. A detector for determining the direction of incidence which for example may be used as further detector 91 of FIG. 15 is schematically shown in FIG. 17.

Figure 17:
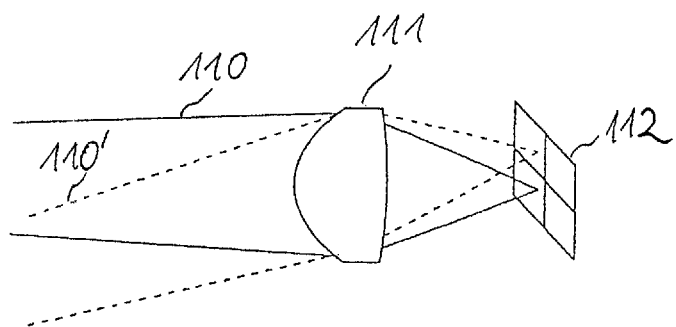
FIG. 17 shows a direction detector according to an embodiment of the present invention.

The detector arrangement of FIG. 17 comprises a collecting lense 111 and a detector 112 which in the example shown is implemented as quadrant diode or four segment photo diodes.

It is to be noted that the use of a quadrant detector, i.e. of a detector with four segments in the embodiment of FIG. 4 is to be understood as merely being an example, and also another number of segments, i.e. a different number of independent photo detectors, may be used, for example more than four photo diodes to obtain a higher spatial resolution. Also other position sensitive detectors, for example CMOS- or CCD-detectors with a plurality of picture elements (so-called pixels) may be used.

In FIG. 17 as an example a light beam 110 is shown in solid lines and a light beam 110' is shown in dashed lines, wherein light beams 110 and 110' impinge on lense 111 from different directions. As may be seen in FIG. 7 this leads also to different locations of the corresponding focused spots on the quadrant detector 112, in this case spots in different quadrants. From the differences of the signals of each quadrant or each segment of detector 112, respectively, corresponding to the above equation (1) the angle of incident light may be determined for the detector arrangement of FIG. 17. Taking the distance of this detector arrangement, which may be called secondary detector channel, to the detector actually used for the surface measurement (detector 104 of FIG. 16 and detectors 61-64 of FIG. 15, respectively) into consideration, also the angle of incident light for this detector, which may be also called primary channel, may be determined, and the detector(s) of the primary channel may be adjusted accordingly.

As can be seen from the variations and modifications discussed above, the present invention is not restricted to the embodiments shown.

The invention claimed is:

1. A device for determining the position of an object in a spatial area, comprising:
    at least one light source for generating at least one light beam;
    a guiding arrangement configured to guide the light beam to a reflector;
    wherein the form of the light beam is chosen such that the light beam covers not a complete area in which the reflector may be located;
    a detector arrangement configured to detect the light beam reflected from the reflector;
    an evaluation circuit configured to determine a position of the object on the basis of the reflected light beams detected by the detector arrangement; and
    a control configured to control the guiding arrangement such that the at least one light beam is directed on that part of the area in which the reflector is located; and
    wherein the control is configured to control the guiding arrangement depending on an amplitude of a signal at the detector arrangement.

2. The device according to claim 1, wherein the reflector is coupled with the object, and
    wherein the at least one light source is stationary.

3. The device according to claim 1, wherein the guiding arrangement is fixed to the object, and wherein the reflector is stationary.

4. The device according to claim 3, wherein the device comprises a plurality of reflectors which comprise the reflector.

5. The device according to claim 1, wherein the device is configured to determine three independent distances and to determine the position of the object by trilateration.

6. The device according to claim 1, wherein the object is mounted to a robot arm,
    wherein the control controls the guiding arrangement based on a position information of the robot arm.

7. The device according to claim 1, comprising a further detector arrangement configured to determine a position of the at least one light beam relatively to the reflector, wherein the control is configured to control the guiding arrangement on the basis of a signal of the further detector arrangement.

8. The device according to claim 7, wherein the further detector arrangement comprises a plurality of light sensitive detectors arranged around the object.

9. The device according to claim 7, wherein the further detector arrangement comprises a plurality of further light sources arranged around the detector and a detector for detecting the light of the further light sources.

10. The device according to claim 7, wherein the further detector arrangement comprises a position sensitive detector.

11. The device according to claim 7, wherein the further detector arrangement is arranged such that they detect light reflected from the reflector and further reflected from the guiding arrangement.

12. The device according to claim 11,
    wherein the further detector arrangement is arranged between the light source and the guiding arrangement and comprises a central light transparent area.

13. The device according to claim 1, wherein the guiding arrangement comprises a movable mirror.

14. The device according to claim 1, wherein the guiding arrangement comprises a movable lense for changing a direction of the light beam.

15. The device according to claim 1, wherein the at least one light source comprises a pulsed laser.

16. The device according to claim 1, further comprising an optic for expanding the light beam.

17. A method for determining the position of an object in a spatial area, comprising:
    guiding of at least one light beam into a part of the spatial area in which a reflector is present;
    detecting a light beam reflected from the reflector;
    determining the position of the object on the basis of the detected reflected light beam; and
    controlling the guiding of the at least one light beam based on an amplitude of a signal detected when the light beam is reflected onto a detector.

18. The method according to claim 17, wherein guiding the light beam in the part of the spatial area in which the reflector is present comprises:
    further determining the position of the object in the spatial area; and
    guiding the light beam depending on the further determining of the position of the object.

19. The method according to claim 18, wherein the further determining of the position of the object has a lower accuracy than the determining of the position of the object.

20. The method according to claim 18, wherein a further determining of the position of the object is performed on the basis of position data of a robot arm to which the object is fixed.

21. The method according to claim 18, wherein the further determining of the position of the object comprises a scanning of the spatial area with the light beam.

22. The method according to claim 17, further comprising:
    determining a measure for the amplitude of the light beam reflected from the object;
    wherein the guiding of the at least one light beam is performed depending on the determined measure for the amplitude.

23. The method according to claim 17, further comprising:
    determining a relative position of the light beam relative to the reflector;
    wherein the guiding of the fight beam into the part of the spatial area in which the reflector is present is performed on the basis of the determining of the relative position.

24. The method according to claim 23, wherein a determining of the relative position comprises a detection with a position sensitive detector.

25. The method according to claim 23, wherein the determining of the relative position comprises a detecting of a plurality of light sources arranged adjacent to the reflector.

26. A device for determining the position of an object in a spatial area, comprising:
    at least one light source for generating at least one light beam;

a guiding arrangement configured to guide the light beam to a reflector;

wherein the form of the light beam is chosen such that the light beam covers not a complete area in which the reflector may be located;

a detector arrangement configured to detect the light beam reflected from the reflector;

an evaluation circuit configured to determine a position of the object on the basis of the reflected light beams detected by the detector arrangement;

a control configured to control the guiding arrangement such that the at least one light beam is directed on that part of the area in which the reflector is located; and a further detector arrangement comprising a plurality of light sensitive detectors arranged around the object.

27. The device according to claim 26, wherein the control is configured to control the guiding arrangement on the basis of a signal of the further detector arrangement.

28. A device for determining the position of an object in a spatial area, comprising:

at least one light source for generating at least one light beam;

a guiding arrangement configured to guide the light beam to a reflector;

wherein the form of the light beam is chosen such that the light beam covers not a complete area in which the reflector may be located;

a detector arrangement configured to detect the light beam reflected from the reflector;

an evaluation circuit configured to determine a position of the object on the basis of the reflected light beams detected by the detector arrangement; and a control configured to control the guiding arrangement such that the at least one light beam is directed on that part of the area in which the reflector is located; and a further detector arrangement configured to determine a position of the at least one light beam relatively to the reflector, and wherein the further detector arrangement is arranged between the light source and the guiding arrangement and comprises a central light transparent area.

29. The device according to claim 28, wherein the reflector is coupled with the object, and wherein the at least one light source is stationary.

30. The device according to claim 28, wherein the guiding arrangement is fixed to the object, and wherein the reflector is stationary.

31. The device according to claim 30, wherein the device comprises a plurality of reflectors which comprise the reflector.

32. The device according to claim 28, wherein the device is configured to determine three independent distances and to determine the position of the object by trilateration.

33. The device according to claim 28, wherein the object is mounted to a robot arm, wherein the control controls the guiding arrangement based on a position information of the robot arm.

34. The device according to claim 28, wherein the guiding arrangement comprises a movable mirror.

35. The device according to claim 28, wherein the guiding arrangement comprises a movable lens for changing a direction of the light beam.

36. The device according to claim 28, further comprising an optic for expanding the light beam.

* * * * *

UNITED STATES PATENT AND TRADEMARK OFFICE
CERTIFICATE OF CORRECTION

| | | |
|---|---|---|
| PATENT NO. | : 8,681,344 B2 | Page 1 of 1 |
| APPLICATION NO. | : 13/394916 | |
| DATED | : March 25, 2014 | |
| INVENTOR(S) | : Spruck et al. | |

It is certified that error appears in the above-identified patent and that said Letters Patent is hereby corrected as shown below:

In the Claims:

Column 22, line 55 (Claim 23) "fight" should be changed to --light--.

Signed and Sealed this
Eighth Day of July, 2014

Michelle K. Lee
*Deputy Director of the United States Patent and Trademark Office*